(12) United States Patent
Zhao et al.

(10) Patent No.: US 11,635,361 B2
(45) Date of Patent: Apr. 25, 2023

(54) TRACEABLE IN-SITU MICRO- AND NANO-INDENTATION TESTING INSTRUMENT AND METHOD UNDER VARIABLE TEMPERATURE CONDITIONS

(71) Applicant: Jilin University, Changchun (CN)

(72) Inventors: Hongwei Zhao, Changchun (CN); Zhaoxin Wang, Changchun (CN); Jianhai Zhang, Changchun (CN); Peng Liu, Changchun (CN); Shunbo Wang, Changchun (CN); Cong Li, Changchun (CN); Xiangyu Zong, Changchun (CN); Shuilong Zhou, Changchun (CN); Honglong Li, Changchun (CN); Jiru Wang, Changchun (CN); Meng Zhang, Changchun (CN); Wenyang Wang, Changchun (CN)

(73) Assignee: Jilin University, Changchun (CN)

( * ) Notice: Subject to any disclaimer, the term of this patent is extended or adjusted under 35 U.S.C. 154(b) by 161 days.

(21) Appl. No.: 17/375,567

(22) Filed: Jul. 14, 2021

(65) Prior Publication Data

US 2022/0018748 A1    Jan. 20, 2022

(30) Foreign Application Priority Data

Jul. 14, 2020  (CN) .......................... 202010674815.3

(51) Int. Cl.
 *G01N 3/42*  (2006.01)
 *G01N 3/06*  (2006.01)
 *G01N 3/08*  (2006.01)

(52) U.S. Cl.
 CPC .............. *G01N 3/42* (2013.01); *G01N 3/066* (2013.01); *G01N 3/068* (2013.01); *G01N 3/08* (2013.01);
 (Continued)

(58) Field of Classification Search
 CPC ............ G01N 23/2251; G01N 29/265; G01N 23/225; G01N 3/32; G01N 3/42;
 (Continued)

(56) References Cited

FOREIGN PATENT DOCUMENTS

CN  210154960 U  * 3/2020
WO  WO-2017107362 A1 * 6/2017 ............. G01N 3/068

* cited by examiner

*Primary Examiner* — Brandi N Hopkins
(74) *Attorney, Agent, or Firm* — HoustonHogle LLP

(57) ABSTRACT

The present disclosure relates to a traceable in-situ micro- and nano-indentation testing instrument and method under variable temperature conditions. A macro-micro switchable mechanical loading module, a nano mechanical loading module and an indentation position optical positioning module are fixed on a gantry beam, an optical imaging axis of an optical microscopic in-situ observation or alignment module and a loading axis of the nano mechanical loading module are coplanar, the optical microscopic in-situ observation or alignment module and the function switchable module are mounted on a table top of a marble pedestal, and a contact or ambient mixed variable temperature module is fixedly mounted on the function switchable module. A modular design is adopted, the micro- and nano-indentation testing instrument is used as a core, in combination with a multi-stage vacuum or ambient chamber, an indentation depth traceability calibration module and multiple sets of optical microscopic imaging assemblies.

17 Claims, 11 Drawing Sheets

(52) U.S. Cl.
CPC ........... *G01N 2203/0019* (2013.01); *G01N 2203/0051* (2013.01); *G01N 2203/0078* (2013.01); *G01N 2203/0228* (2013.01); *G01N 2203/0617* (2013.01); *G01N 2203/0647* (2013.01)

(58) Field of Classification Search
CPC ......... G01N 3/066; G01N 3/068; G01N 3/08; G01N 2203/0019; G01N 2203/0051; G01N 2203/0078; G01N 2203/0228; G01N 2203/0617; G01N 2203/064; G01N 23/02; G01N 21/01; G01N 19/04; G01N 37/00; G01N 15/1056; G01N 3/44; G01N 33/54373; G01N 33/50; G01Q 30/12; G01Q 10/065; G01Q 40/00; B23K 26/38
See application file for complete search history.

TRACEABLE IN-SITU MICRO- AND NANO-INDENTATION TESTING INSTRUMENT AND METHOD UNDER VARIABLE TEMPERATURE CONDITIONS

CROSS REFERENCE TO RELATED APPLICATION

This patent application claims the benefit and priority of Chinese Patent Application No. 202010674815.3 filed on Jul. 14, 2020, the disclosure of which is incorporated by reference herein in its entirety as part of the present application.

TECHNICAL FIELD

The present disclosure relates to the technical field of precise instruments and material test, in particular to a traceable in-situ micro- and nano-indentation testing instrument and method under variable temperature conditions. The traceable in-situ micro- and nano-indentation testing instrument and method under variable temperature conditions can be used for studying local mechanical properties of materials with different dimensions under variable temperature conditions, and provide a new technical means for revealing the micro-zone mechanical properties and damage mechanisms of the materials in a service environment.

BACKGROUND ART

Materials are a substance basis of human civilization, and also the support and precursor of all high and new technologies. In recent years, with the development of micromechanics and microelectronics technologies and continuous improvement of synthesis and preparation processes of new materials such as thin films and coating materials, characteristic scales of the materials have become increasingly small. A traditional macroscopic testing method obviously cannot meet the property test requirements for low-dimensional materials. In addition, Outline of the National Medium- and Long-Term Program for Science and Technology Development also emphasizes at multiple levels and multiple aspects: study of interactions between material service and the environment, performance evolution, and failure mechanism is a basic study on national major strategic needs. Therefore, development of a traceable in-situ micro- and nano-indentation testing method under continuously variable temperature conditions is extremely important for studying material evolution rule of the materials with different dimensions under near-service conditions.

At present, an in-situ micro- and nano-indentation testing technique under variable temperature conditions is still in a rapid development stage, which specifically shows as follows: (1) In terms of a temperature loading principle and method, under the limitation of problems such as continuously variable temperature by direct immersion of a refrigerant (such as a low-temperature hardness testing device developed by Iwabuchi et al. of Iwate University in Japan), influence of contact temperature drift of continuously variable temperature cold sources (including refrigerators, cryostats and the like) on indentation depth measurement (such as a continuous temperature-regulating high-vacuum low-temperature micro- and nano-indentation testing device involved in Chinese patent CN 104697872 A), and relatively low refrigerating power existing in the manners without refrigerants such as thermoelectric refrigeration (such as a Peltier refrigeration manner adopted by Pethica et al., University of Oxford, and Cheney et al., University of Birmingham), a temperature loading method of an existing self-developed testing instrument seriously influences the accuracy of the testing results and directly limits the temperature loading range; (2) In terms of testing object dimensions and testing methods, for the continuously variable temperature micro- and nano-indentation testing method, continuous variable temperature loading is implemented mainly by a commercialized micro mechanical testing system, a nano-indentation testing system and an in-situ micro mechanical property testing system, and in combination with a self-made or commercialized temperature loading module (such as Bruker-Hysitron xSol cold stage). Such testing method has the disadvantages of high costs in equipment and unitary testing method. In another type of the testing methods, equipment independently developed by research and development institutions is limited by the temperature loading manner in (1), which often causes that the testing precision can only reach the level of a macro indentation test, and cannot meet the testing requirements for two-dimensional thin film materials growing or coated on a substrate material; and (3) In terms of auxiliary monitoring means, micro- and nano-indentation testing instruments under variable temperature conditions, combined with a scanning electron microscope, an atomic force microscope and an optical microscopic imaging system, gradually become the mainstream design, such as an in-situ low-temperature nano indentation testing instrument developed by Lee et al., California Institute of Technology, and Bruker-Hysitron Ti-950 atomic force scanning imaging.

In addition, the micro- and nano-indentation testing instrument under variable temperature conditions, involved in related research, usually only adopts modularized addition of the temperature loading module on the basis of a room temperature indentation testing instrument, and a calibration method under variable temperature conditions often follow a room temperature calibration method (see ISO 14577 for details), which obviously does not consider the displacement measurement errors caused by thermal expansion or contraction of an indentation tip under variable temperature conditions.

Therefore, it is necessary to design a traceable in-situ micro- and nano-indentation testing instrument under continuously variable temperature conditions for testing materials with different dimensions, which can perform in-situ monitoring by optical microscopic components, and have great development prospects and application values in the fields of material science, aerospace and superconducting applications and the like.

SUMMARY

The present disclosure aims to provide a traceable in-situ micro- and nano-indentation testing instrument and method under variable temperature conditions, to overcome the defects such as a single dimension, uneven temperature loading and inaccurate indentation depth measurement of a testing object in the existing in-situ micro- and nano-indentation testing technique under variable temperature conditions. The present disclosure can implement in-situ monitoring of micro-zone mechanical properties of materials with different dimensions, and study interaction between the materials and service environments, property evolution and failure mechanisms under variable temperature conditions.

The foregoing objective of the present disclosure is implemented by the following technical solution.

It is provided a traceable in-situ micro- and nano-indentation testing instrument under variable temperature conditions, including a vacuum or ambient chamber module 1, a gantry beam 2, a macro-micro switchable mechanical loading module 3, a nano mechanical loading module 4, an indentation position optical positioning module 5, an optical microscopic in-situ observation or alignment module 6, a metal bellows 7, an air floating vibration isolation platform 8, an optical breadboard 9, a marble pedestal 10, a function switchable module 11, and a contact or ambient mixed variable temperature module 12. The macro-micro switchable mechanical loading module 3, the nano mechanical loading module 4 and the indentation position optical positioning module 5 are fixed on the gantry beam 2, and mechanical loading axes and optical imaging axes are laterally coincided by regulating thicknesses of shims. An optical imaging axis of the optical microscopic in-situ observation or alignment module 6 and a loading axis of the nano mechanical loading module 4 are coplanar, the optical microscopic in-situ observation or alignment module 6 and the function switchable module 11 are mounted on a table top of the marble pedestal 10 in a nonintervention manner. The contact or ambient mixed variable temperature module 12 is fixedly mounted on the function switchable module 11. A sinking tank is milled in a lower end surface of the marble pedestal 10 which is mounted on the optical breadboard 9, the optical breadboard 9 guarantees airtightness of the vacuum or ambient chamber module 1 through the metal bellows 7 to be further connected with the air floating vibration isolation platform 8, to isolate medium-frequency and high-frequency vibration noises outside the device.

In the macro-micro switchable mechanical loading module 3, a large-stroke pre-loading piezoelectric actuator 310 is fixedly mounted on a first direct-current servo displacement driving platform 36 through a piezoelectric ceramic fixing seat 37 and a direct-acting flexible hinge 34, and a macro mechanical loading detection unit is connected to a displacement output end of the direct-acting flexible hinge 34 through a dovetail-shaped mounting block 35. A micro mechanical loading detection unit 39 having a same assembling structure as the macro mechanical loading detection unit, as a fast-inserting replacement module, is fixed on an L-shaped connecting frame 38 positioned at two sides of the large-stroke pre-loading piezoelectric actuator 310 through the dovetail-shaped mounting block 35. The macro mechanical loading detection unit and the micro mechanical loading detection unit 39 which are switchable, each are equipped with a unipolar plate capacitive displacement sensor 32 and a strain gage force measuring unit 31 having a corresponding measuring range, and the macro mechanical loading detection unit and the micro mechanical loading detection unit 39 cooperate with an independent manual displacement platform 33 to regulate a space between the unipolar plate capacitive displacement sensor 32 and an indentation displacement measuring plate 311 to realize a mechanical loading testing function for materials with different dimensions.

The macro mechanical loading detection unit and the micro mechanical loading detection unit 39 perform micro-zone mechanical testing functions for indentations, scratches and reciprocating friction abrasions by replacing a functional indentation tip 393. The functional indentation tip 393 is fixed at a tail end of an indentation holder 312 with an optical contact reference ring 394 through a first set screw 392.

The strain gage force measuring unit 31 is connected with a force measuring unit connecting block 396 through threads, and is limited through a force measuring unit lead pressing sheet 395, and the force measuring unit connecting block 396 is fixedly connected to the dovetail-shaped mounting block 35 through a second set screw 391.

In the nano mechanical loading module 4, an MEMS micro force sensor 42 is fixedly mounted at a tail end of a rigid connecting bar 43 through a screw, and is connected to a displacement output end of a bridge amplification flexible hinge 44 through the dovetail-shaped mounting block 35, wherein a closed-loop pre-loading piezoelectric actuator 41 is mounted in the bridge amplification flexible hinge 44 which is fixedly connected to a movement table top of a second direct-current servo displacement driving platform 45.

In the indentation position optical positioning module 5, a microscopic imaging assembly is mounted on a focusing platform 52 through a connecting plate to locate a micro-zone mechanical property testing position, the optical microscopic imaging assembly comprises a CCD image collector 51, a low-power-consumption LED light source 53 and a long-working-distance objective lens 55 connected to an electric objective lens rotary table 54, to realize optical imaging of a micro-zone mechanical property testing zone at a room temperature or low temperature; and the CCD image collector 51 is mounted at an optical microscopic imaging body through a standard C-shaped interface.

In the optical microscopic in-situ observation or alignment module 6, a monocular optical microscopic imaging assembly 65 regulates three degrees of freedom of an optical imaging zone through a monocular optical microscopic imaging assembly angle regulating frame 61, a first manual focusing platform 63 and a second manual focusing platform 64, and is fixedly mounted on the marble pedestal 10 through a first connecting plate 62. The monocular optical microscopic imaging assembly angle regulating frame 61 regulates an angle between an imaging axis of the monocular optical microscopic imaging assembly and a loading axis of the nano mechanical loading module 4 through an arc waist shaped tank, and provides an additional degree of freedom for the monocular optical microscopic imaging assembly 65 through a closed-loop large-stroke function switchable platform 111 in the function switchable module 11, to perform in-situ observation imaging of testing objects in micro-zone mechanical property testing zones.

In the contact or ambient mixed variable temperature module 12, testing samples 1212 are in clearance fit with a thermal insulation framework 1214, and are fixed through a negative pressure adsorption tank substrate 1211, and the negative pressure adsorption tank substrate 1211 is fixedly connected with a lower refrigerating unit 1210 and communicated with a negative pressure adsorption opening 127. A sinking tank is milled in the lower refrigerating unit 1210, and Rb—Fe—B permanent magnets 1224 are fixed on two sides of the thermal insulation framework 1214; a lower refrigerating unit X-shaped supporting plate 1219 cooperates with four sets of disc springs 1225 to guarantee surface stiffness of the testing samples 1212, and is fixedly connected with a lower cavity body 128. An upper refrigerating unit 129 and a replaceable gas outlet cover plate 124 form an inert gas storage chamber and an annular gas outlet tank, the upper refrigerating unit 129 is fixedly connected with an upper cavity cover 1222 through an upper refrigerating unit supporting plate 1226 and is closed for thermal insulation through a pressure plate 123. Inert gas is introduced into the annular storage chamber through an ambient pump inlet 121 to be sufficiently refrigerated or heated, and then passes through the annular gas outlet tank to apply a uniform temperature load on the indentation holder 312; refrigerant refrigerates the upper refrigerating unit 129 and the lower refrigerating unit 1210 through an upper cavity cover refrigerating medium inlet 125 and a lower cavity body refrigerating medium inlet 126, and thermal insulation materials 1223 are filled in the chamber for thermal preservation and thermal insulation; and the upper cavity cover 1222 and the lower cavity body 128 are positioned through a positioning groove, and are locked through multiple sets of connecting rod assemblies 1220, and the lower cavity body 128 with a through hole is mounted and fixed on the closed-loop large-stroke function switchable platform 111 through a second connecting plate 1213.

It is also provided a traceable in-situ micro- and nano-indentation testing method under variable temperature conditions, a variable-temperature micro-zone mechanical property in-situ testing and traceability calibration method for block materials or thin film materials based on an indentation test, including the following steps:

replacing the functional indentation tip 393 at the tail end of the indentation holder 312 of the macro-micro switchable mechanical loading module 3 with a standard aluminum lens; regulating an axis of a laser interferometer probe 133 to coincide with that of the standard aluminum lens through a laser interferometer adjusting frame 132, and performing traceability calibration on an indentation displacement of an air indentation for the macro-micro switchable mechanical loading module 3 at a room temperature; removing oxygen and water vapor in the chamber by repeatedly replacing the ambient through a vacuum pump assembly and a compressing ambient gas cylinder of the vacuum or ambient chamber module 1 to enable an ambient pressure in the chamber to be close to an atmosphere pressure; starting an internal circulating pump, forming a continuously variable temperature ambient loading environment through inert ambient by a refrigerating unit and a temperature control resistance wire, and performing the traceability calibration on the indentation displacement of the air indentation for the macro-micro switchable mechanical loading module 3 under variable temperature conditions;

bonding a block sample onto a surface of the negative pressure adsorption tank substrate 121 through low-temperature varnish, and performing a linear point exchange for an indentation position through the contact or ambient mixed variable temperature module 12 placed on the closed-loop large-stroke function switchable platform 111; or placing the block sample in a groove of the thermal insulation framework 123, firmly absorbing the testing samples 1212 firmly through the negative pressure adsorption tank substrate 121 by controlling a switch of a negative pressure adsorption pump; dragging the thermal insulation framework 123 by the two-dimensional stick-slip piezoelectric point exchange platform 125 to perform the point exchange in a plane, accurately positioning a point exchange position through the indentation position optical positioning module 5; providing the optical contact reference ring 394 at the tail end of the indentation holder 312, detecting displacement signal increment variation through the optical-approaching laser interferometer probe assembly 124; driving the indentation holder 312 by the first direct-current servo displacement driving platform 36 to rapidly approach the testing samples 1212, and then utilizing the large-stroke pre-loading piezoelectric actuator 310 to perform precise driving and loading;

configuring a fixing manner and a point exchange method for a nano thin film sample to be consistent with those of the block sample, in view of a principle that a maximum indentation depth is lower than 10% of a thickness of the nano thin film sample; wholly removing an ambient refrigerating upper chamber in the contact or ambient mixed variable temperature module 12; controlling a space between the MEMS micro force sensor 42 and the nano thin film sample to be within a displacement output amount of the bridge amplification flexible hinge 44 to complete alignment through cooperation of the nano mechanical loading module 4 with the optical microscopic in-situ observation or alignment module 6, then regulating an angle and a working distance between the monocular optical microscopic imaging assembly 65 and a loading axis of the indentation tip; performing in-situ observation of micro-zone deformation behavior of the thin film sample based on a microscopic imaging system;

in combination with surface topography and deformation damage images of indentation zones of materials under variable temperature conditions, obtaining an indentation load-depth curve through testing the materials with different dimensions and performing data processing on the indentation load-depth curve based on a classical analysis theory, and obtaining hardness and Young's modulus of micro-zone mechanical property indexes of the materials under corresponding temperature conditions.

The traceable in-situ micro- and nano-indentation testing instrument and method have the following beneficial effects.

1. The present disclosure provides a micro-zone mechanical property in-situ testing technique under variable temperature conditions based on an indentation test as a core. Through load and displacement sensors having different measuring ranges and resolution ratios, by analyzing the extracted indentation load-depth curve, a proper mechanical model is constructed, and various mechanical parameters such as hardness, Young's modulus, yield strength, work-hardening index, of testing materials are measured.

2. In combination with a multi-stage vacuum or ambient chamber and a temperature control strategy, various temperature loading working conditions of different ambient environments, constant-temperature or continuously variable temperature environment and the like are constructed, and a technical support is provided for the mechanical behavior of the materials under the mechanical-chemo-thermal coupling action under the situation that the materials with different dimensions approach service working conditions.

3. A modular design is adopted. A micro- and nano-indentation testing instrument is used as a core; in combination with a multi-stage vacuum or ambient chamber, an indentation depth traceability calibration module and multiple sets of optical microscopic imaging assemblies, study of indentation depth calibration, alignment of the nano mechanical loading micro force sensor and precise positioning of the indentation position under variable temperature conditions, and study of in-situ dynamic monitoring of micro-zone mechanical properties, damage mechanisms and the like of testing materials with different dimensions are implemented.

BRIEF DESCRIPTION OF THE DRAWINGS

The accompanying drawings described here are provided for further understanding of the present disclosure, and constitute a part of the application. The exemplary examples and illustrations thereof are intended to explain the present disclosure, without inappropriate limitations to the present disclosure.

Figure 1:
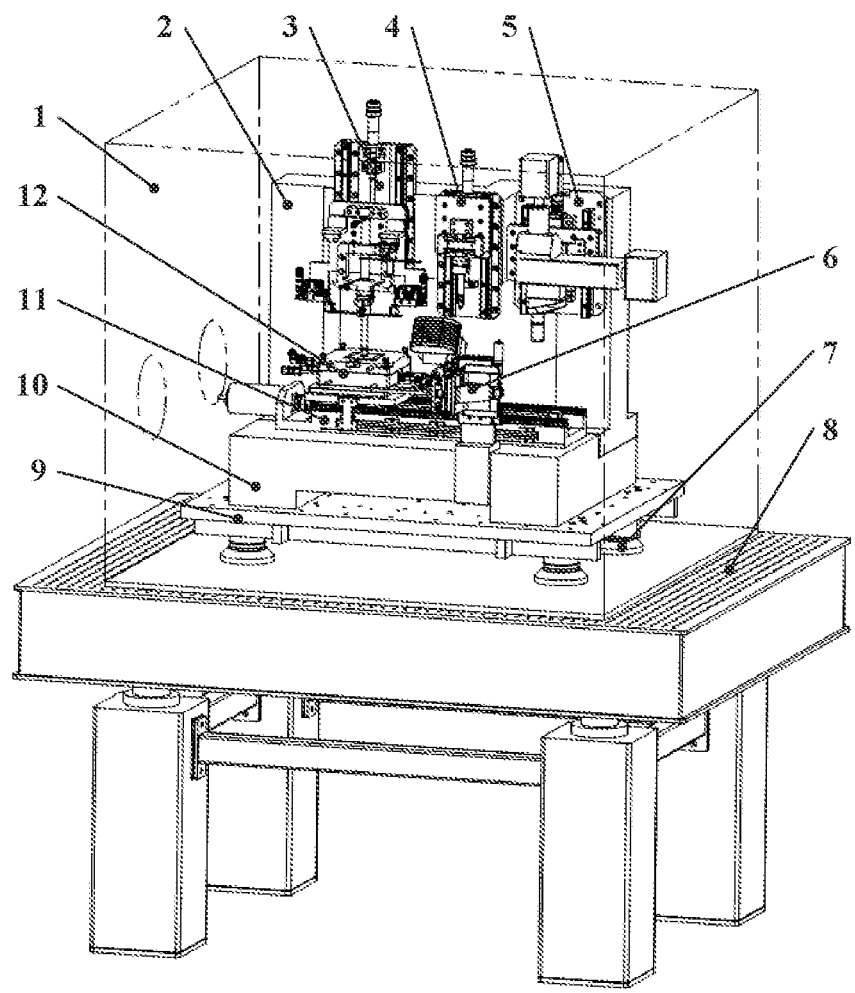
FIG. 1 is an axonometric drawing of a whole testing device disclosed by the present disclosure.
Figure 2:
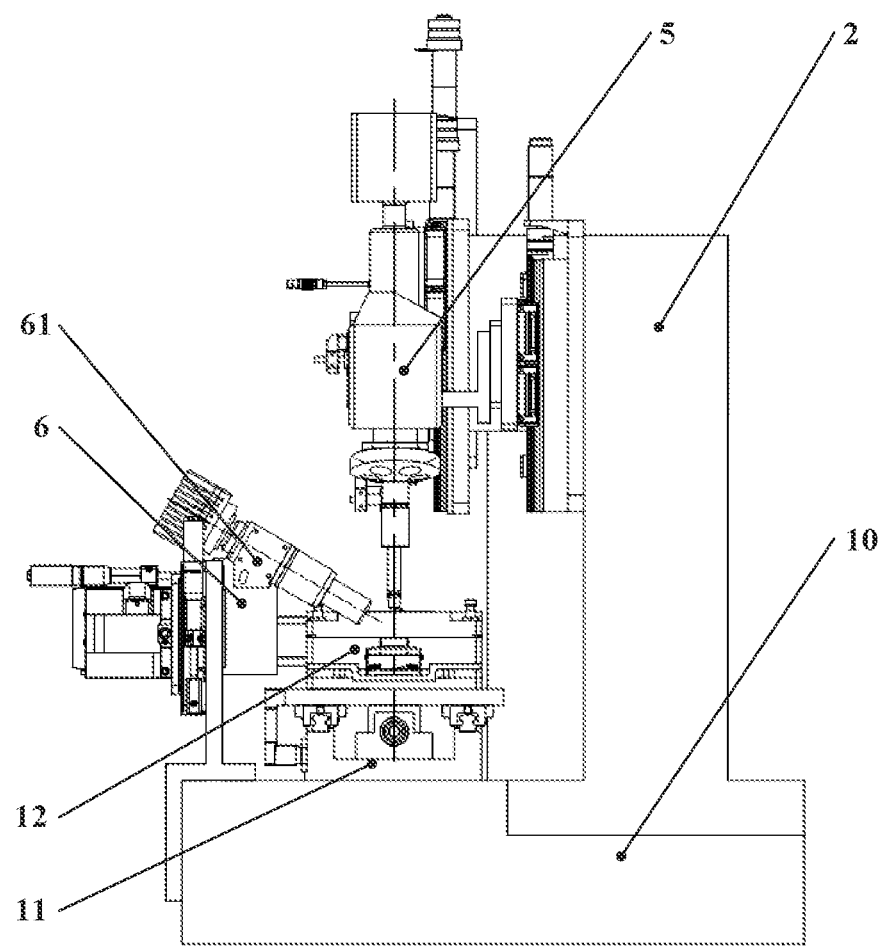
FIG. 2 is a side elevation drawing of a micro-zone mechanical property testing device disclosed by the present disclosure.

List of reference numbers; 1 vacuum or ambient chamber module; 2 gantry beam; 3 macro-micro switchable mechanical loading module; 31 strain gage force measuring unit; 32 unipolar plate capacitive displacement sensor; 33 manual displacement platform; 34 direct-acting flexible hinge; 35 dovetail-shaped mounting block; 36 first direct-current servo displacement driving platform; 37 piezoelectric ceramic fixing seat; 38 L-shaped connecting frame; 39 micro mechanical loading detection unit; 391 second set screw; 392 first set screw; 393 functional indentation tip; 394 optical contact reference ring; 395 force-measuring-unit lead pressing sheet; 396 force measuring unit connecting block; 310 large-stroke pre-loading piezoelectric actuator; 311 indentation displacement measuring plate; 312 indentation holder; 4 nano mechanical loading module; 41 closed-loop pre-loading piezoelectric actuator; 42 MEMS micro force sensor; 43 rigid connecting bar; 44 bridge amplification flexible hinge; 45 second direct-current servo displacement driving platform; 5 indentation position optical positioning module; 51 CCD image collector; 52 focusing platform; 53 LED light source; 54 electric objective lens rotary table; 55 long-working-distance objective lens (including protective cover); 6 optical microscopic in-situ observation or alignment module; 61 monocular optical microscopic imaging assembly angle regulating frame; 62 first connecting plate; 63 first manual focusing platform; 64 second manual focusing platform; 65 monocular optical microscopic imaging assembly; 7 metal bellows; 8 air floating vibration isolation platform; 9 optical breadboard; 10 marble pedestal; 11 function switchable module; 111 closed-loop large-stroke function switchable platform; 12 contact or ambient mixed variable temperature module; 121 ambient pump inlet; 122 lower chamber temperature control lead; 123 pressure plate; 124 replaceable gas outlet cover plate; 125 upper chamber cover refrigerating medium inlet; 126 lower chamber body refrigerating medium inlet; 127 negative pressure adsorption opening; 128 lower chamber body; 129 upper refrigerating unit; 1210 lower refrigerating unit; 1211 negative pressure adsorption tank substrate; 1212 testing sample; 1213 second connecting plate; 1214 thermal insulation framework; 1215 third connecting plate; 1216 optical-approaching laser interferometer probe assembly; 1217 two-dimensional stick-slip piezoelectric point exchange platform; 1218 N-shaped connecting plate; 1219 lower refrigerating unit X-shaped supporting plate; 1220 connecting rod assembly; 1221 upper chamber cover temperature control lead; 1222 upper chamber cover; 1223 thermal insulation material; 1224 Rb—Fe—B permanent magnet; 1225 disc spring; 1226 upper refrigerating unit supporting plate; 13 indentation depth traceability calibration module; 131 mounting frame; 132 laser interferometer adjusting frame; 133 laser interferometer probe; 134 laser incidence or reflection light path.

DETAILED DESCRIPTION OF THE EMBODIMENTS

The detailed contents and specific implementation of the present disclosure will be further described below in conjunction with the accompanying drawings.

Referring to FIG. 1-FIG. 9, a traceable in-situ micro- and nano-indentation testing instrument under variable temperature conditions, disclosed by the present disclosure, can overcome the defects such as single dimension of testing objects, uneven loading temperatures and inaccurate measurement of indentation depths, in the existing in-situ micro- and nano-indentation testing technique under variable temperature conditions. By utilizing load and displacement sensors with different measuring ranges and resolution ratios, adopting the micro- and nano-indentation testing instrument as a core device, in combination with a multi-stage vacuum or ambient chamber, an indentation depth traceability calibration module and a plurality of groups of optical microscopic imaging assemblies, indentation depth calibration, alignment of nano mechanical loading micro force sensors, precise positioning of indentation positions, and in-situ dynamic monitoring under variable temperature conditions are realized, and a new technical means is provided for study of micro-zone mechanical properties and damage mechanisms of materials under variable temperature conditions. The traceable in-situ micro- and nano-indentation testing instrument under variable temperature conditions mainly includes a vacuum or ambient chamber module 1, a gantry beam 2, a macro-micro switchable mechanical loading module 3, a nano mechanical loading module 4, an indentation position optical positioning module 5, an optical microscopic in-situ observation or alignment module 6, a metal bellows 7, an air floating vibration isolation platform 8, an optical breadboard 9, a marble pedestal 10, a function switchable module 11 and a contact or ambient mixed variable temperature module 12. The macro-micro switchable mechanical loading module 3, the nano mechanical loading module 4 and the indentation position optical positioning module 5 enable mechanical loading axes and optical imaging axes to laterally coincide by adjusting thicknesses of shims, and are fixed on the gantry beam 2. An optical imaging axis of the optical microscopic in-situ observation or alignment module 6 and a loading axis of the nano mechanical loading module are coplanar, the optical microscopic in-situ observation or alignment module 6 and the function switchable module 11 are mounted on a table top of the marble pedestal 10 in a nonintervention manner. The contact or ambient mixed variable temperature module 12 is fixedly mounted on the function switchable module 11 to guarantee no intervention in a function switchable process. A sinking tank is milled in a lower end surface of the marble pedestal 10 which is mounted on the optical breadboard 9 which guarantees airtightness of the vacuum or ambient chamber module 1 through the metal bellows 7, further the marble pedestal 10 is connected with the air floating vibration isolation platform 8, to isolate medium-frequency and high-frequency vibration noises outside the device.

Figure 3:
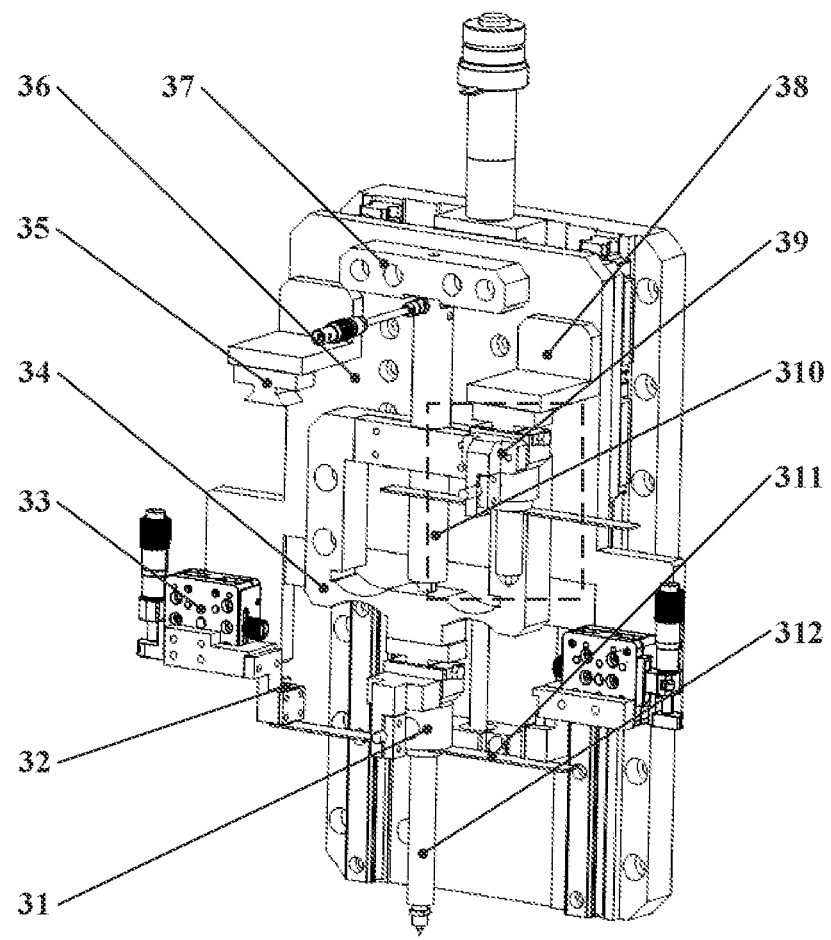
FIG. 3 is an axonometric drawing of a macro-micro switchable mechanical loading module disclosed by the present disclosure.
Figure 4:
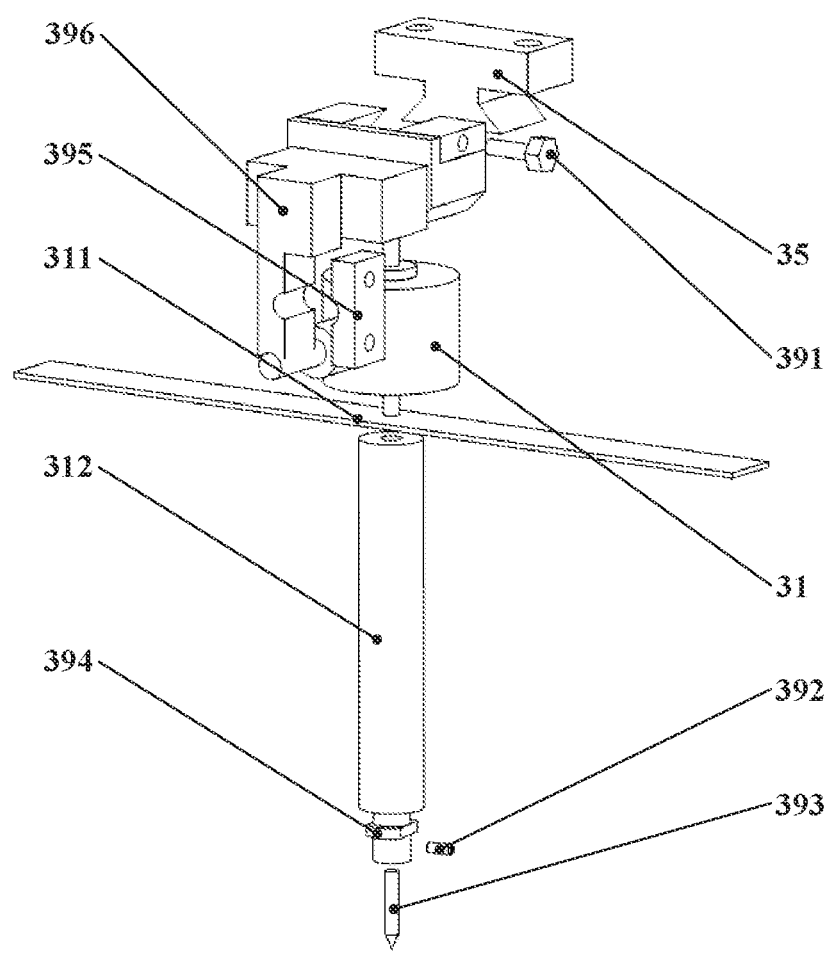
FIG. 4 is an exploded drawing of an assembling structure of a mechanical loading detection unit disclosed by the present disclosure.

Referring to FIG. 3 and FIG. 4, the macro-micro switchable mechanical loading module 3 mainly includes a large-stroke pre-loading piezoelectric actuator 310, a first direct-current servo displacement driving platform 36, a direct-acting flexible hinge 34, a micro mechanical loading detection unit 39, a unipolar plate capacitive displacement sensor 32 and a strain gage force measuring unit 31. The large-stroke pre-loading piezoelectric actuator 310 is fixedly mounted on the first direct-current servo displacement driving platform 36 through a piezoelectric ceramic fixing seat 37 and the direct-acting flexible hinge 34, and a macro mechanical loading detection unit is connected to a displacement output end of the direct-acting flexible hinge 34 through a dovetail-shaped mounting block 35. The micro mechanical loading detection unit 39 having the same assembling structure as the macro mechanical loading detection unit, as a replaceable module, is fixed on L-shaped connecting frames 38 positioned at two sides of the large-stroke pre-loading piezoelectric actuator 310 through the dovetail-shaped mounting blocks 35. The macro-micro switchable mechanical loading module cooperates with the unipolar plate capacitive displacement sensor 32 and the strain gage type force measuring unit 31 respectively having different measuring ranges, and cooperates with an independent manual displacement platform 33 to regulate a space between the unipolar plate capacitive displacement sensor 32 and an indentation displacement measuring plate 311 to realize a mechanical loading testing function for materials with different dimensions.

In some embodiments, based on kinds of micro-zone mechanical parameters to be detected, for the mechanical loading detection unit, the functional indentation tip 393 fixed at a tail end of the indentation holder 312 with the optical contact reference ring 394 through the first set screw 392, and a signal detection unit can be replaced to realize micro-zone mechanical testing functions of indentation, scratches, reciprocating friction abrasion and the like.

In some embodiments, the strain gage force measuring unit 31 in the mechanical loading detection unit is connected with a force measuring unit connecting block 396 through threads, and due to a lead interference problem, a force measuring unit lead pressing sheet 395 is designed for limiting, where the force measuring unit connecting block 396 is fixedly connected to the dovetail-shaped mounting block 35 through the second set screw 391.

Figure 5:
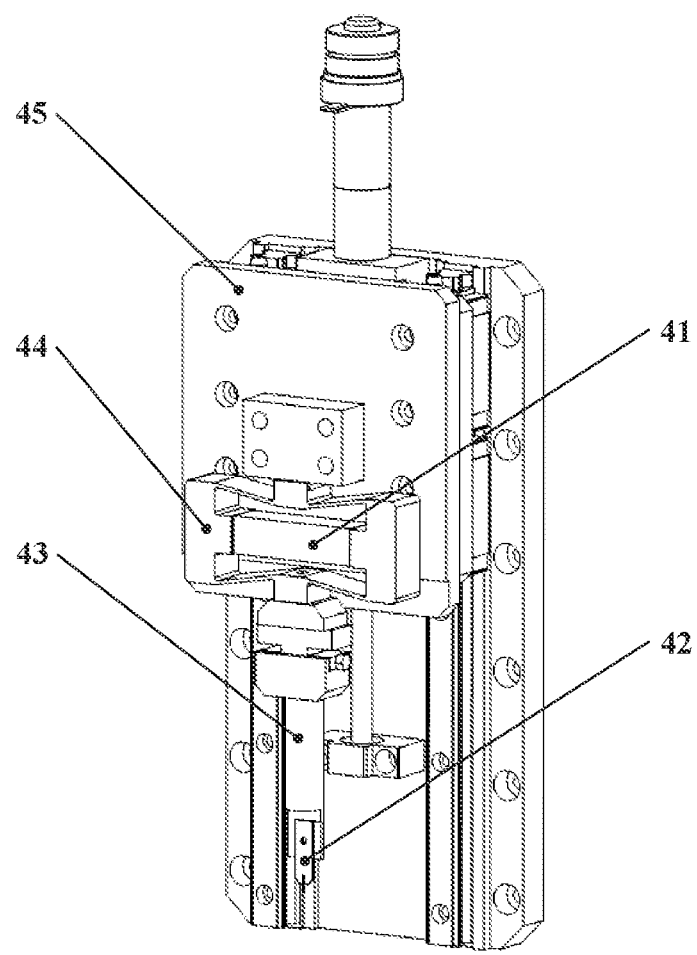
FIG. 5 is an axonometric drawing of a nano mechanical loading module disclosed by the present disclosure.

Referring to FIG. 5, the nano mechanical loading module 4 mainly includes a MEMS micro force sensor 42, a bridge amplification flexible hinge 44, a closed-loop pre-loading piezoelectric actuator 41 and a second direct-current servo displacement driving platform 45. The MEMS micro force sensor 42 is fixedly mounted at a tail end of a rigid connecting bar 43 through a screw, and is connected to the displacement output end of the bridge amplification flexible hinge 44 through the dovetail-shaped mounting block 35 having a similar assembling structure, where the closed-loop pre-loading piezoelectric actuator 41 is mounted in the bridge amplification flexible hinge 44 which is fixedly connected to a movement table top of the second direct-current servo displacement driving platform 45.

Figure 7:
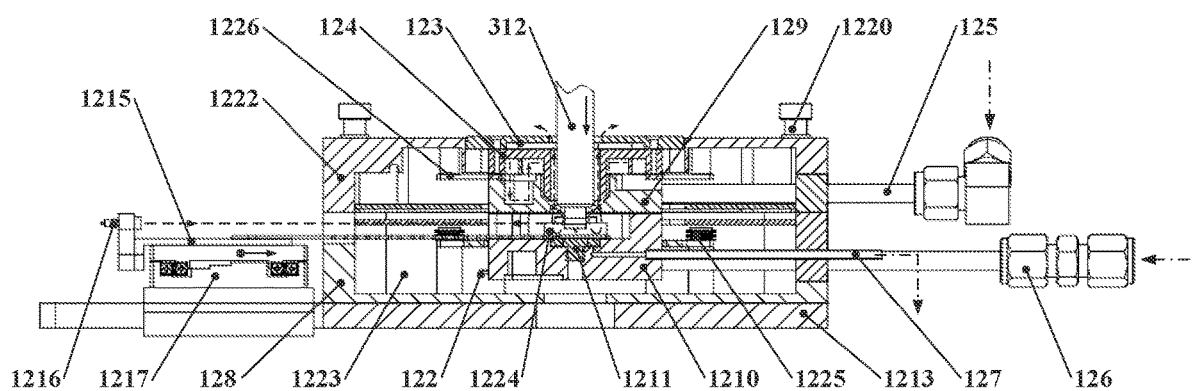
FIG. 7 is a complete cross section drawing of the contact or ambient mixed variable temperature module disclosed by the present disclosure.
Figure 8:
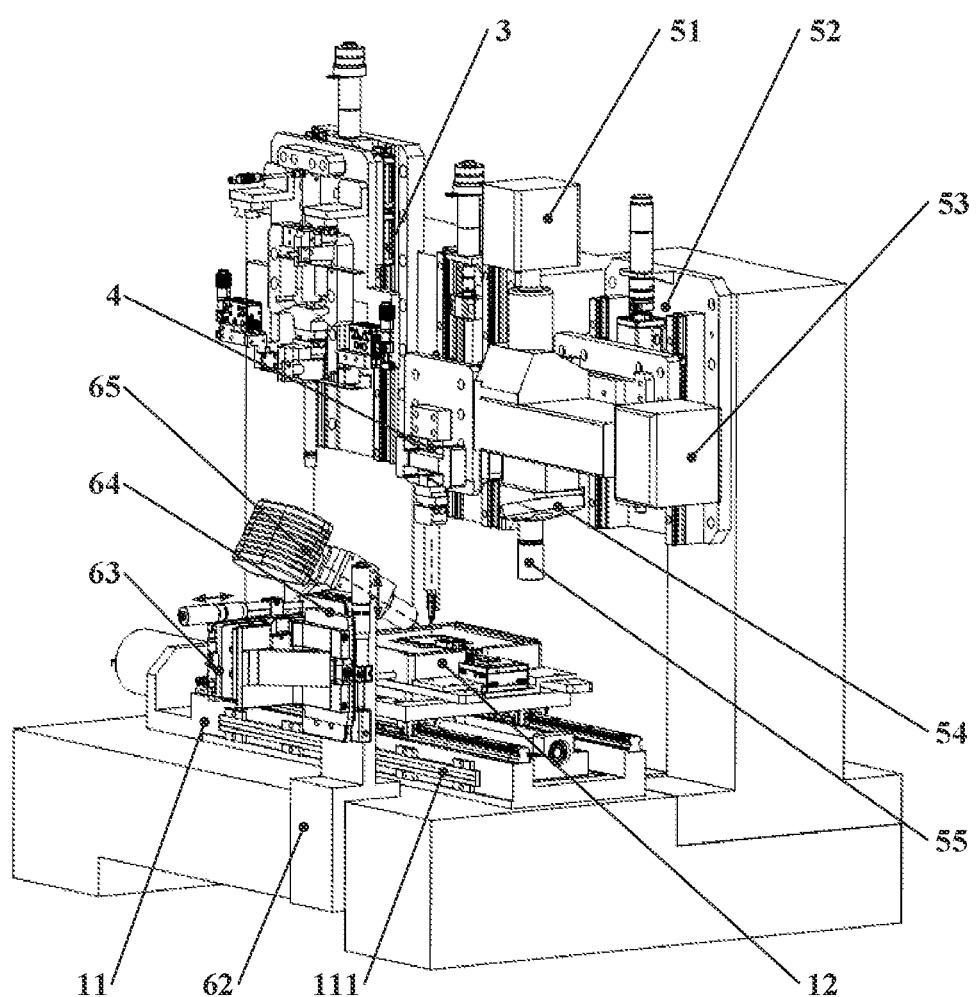
FIG. 8 shows an axonometric drawing of a nano indentation in-situ observation and an alignment state of a micro force probe disclosed by the present disclosure.

Referring to FIG. 7 and FIG. 8, the indentation position optical positioning module 5 includes a focusing platform 52 and an optical microscopic imaging assembly. The optical microscopic imaging assembly is mounted on the focusing platform 52 through a connecting plate to locate a micro-zone mechanical property testing position. The optical microscopic imaging assembly includes a CCD image collector 51 and a low-power-consumption LED light source 53 mounted on an optical microscopic imaging body through standard C-shaped interfaces and further includes a long-working-distance objective lens (including a protective cover) 55 connected to an electric objective lens rotary table 54, to realize optical imaging of a micro-zone mechanical property testing zone at a room temperature or a low temperature.

The optical microscopic in-situ observation or alignment module 6 includes a monocular optical microscopic imaging assembly 65 and a focusing platform. The monocular optical microscopic imaging assembly 65 realizes three degrees of freedom regulation of an optical imaging zone through a monocular optical microscopic imaging assembly angle regulating frame 61, a first manual focusing platform 63 and a second manual focusing platform 64, and is fixedly mounted on the marble pedestal 10 through a first connecting plate 62. The monocular optical microscopic imaging assembly angle regulating frame 61 regulates an angle between an imaging axis of the monocular optical microscopic imaging assembly and a loading axis of the nano mechanical loading module 4 through an arc waist shaped tank, and provides an additional degree of freedom for the monocular optical microscopic imaging assembly 65 through a closed-loop large-stroke function switchable platform 111 in the function switchable module 11, to realize in-situ observation imaging of the testing objects in the micro-zone mechanical property testing zone.

Figure 6:
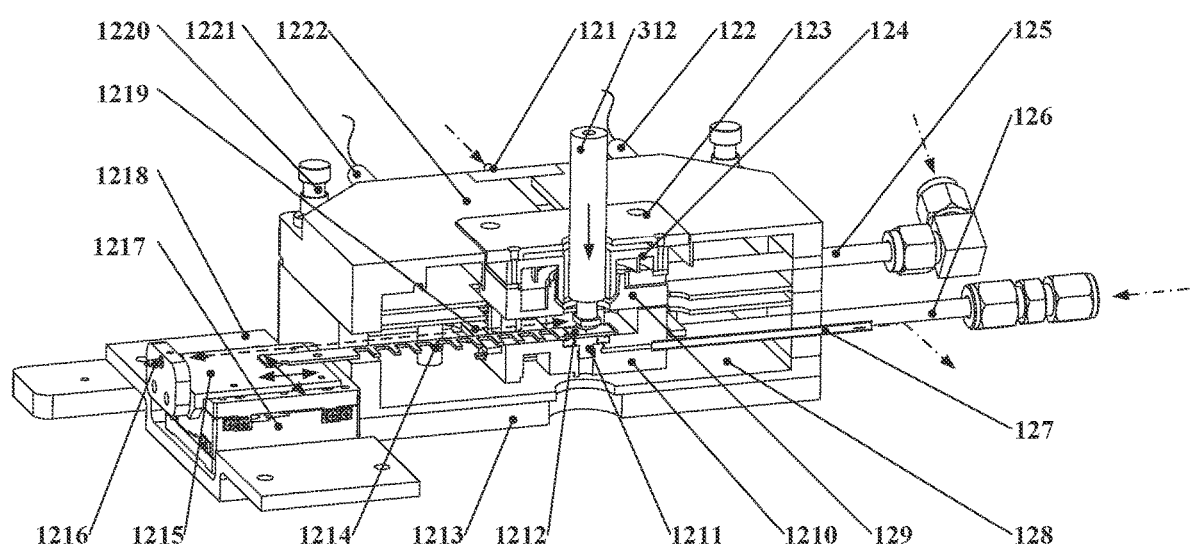
FIG. 6 is an axonometric drawing of a complete cross section of a contact or ambient mixed variable temperature module disclosed by the present disclosure.
Figure 10:
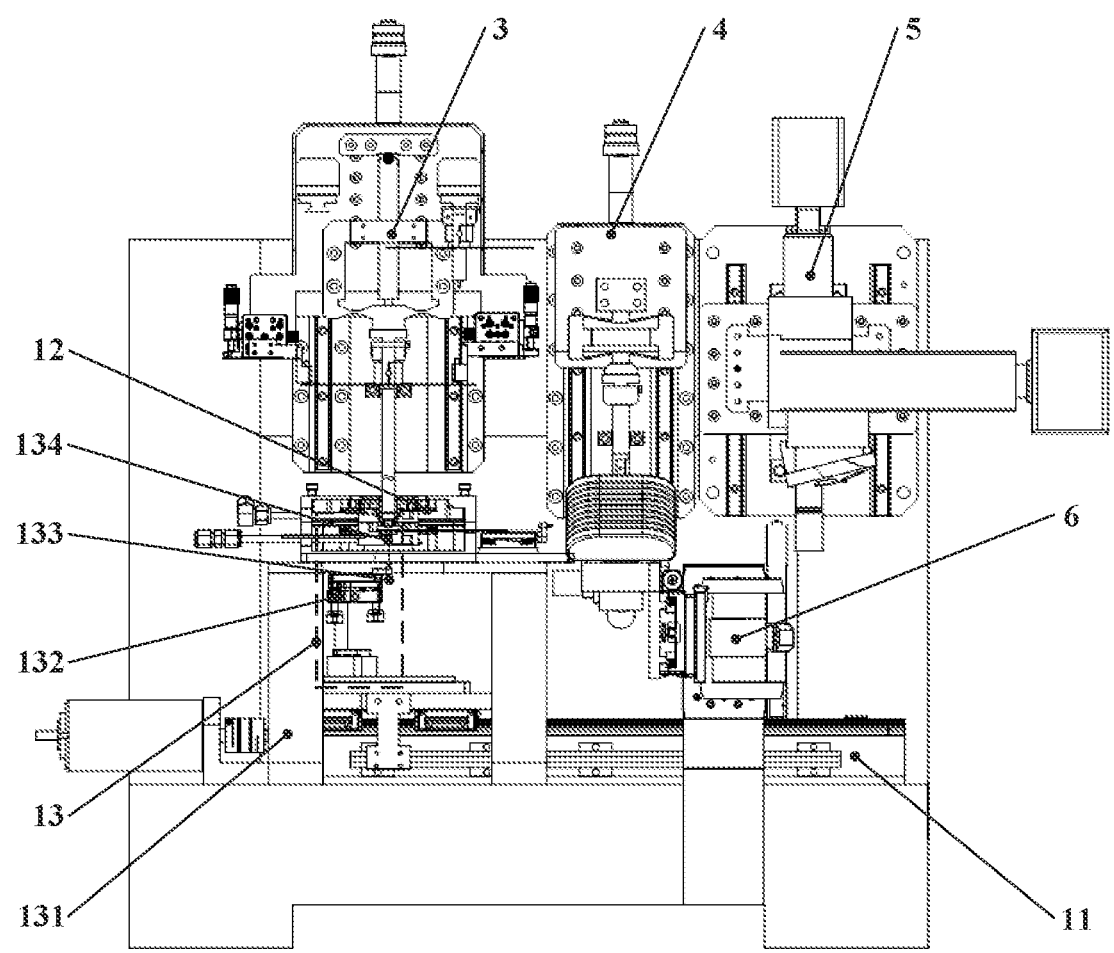
FIG. 10 is a front view of the device in an indentation depth traceable state under variable temperature conditions disclosed by the present disclosure.
Figure 11:
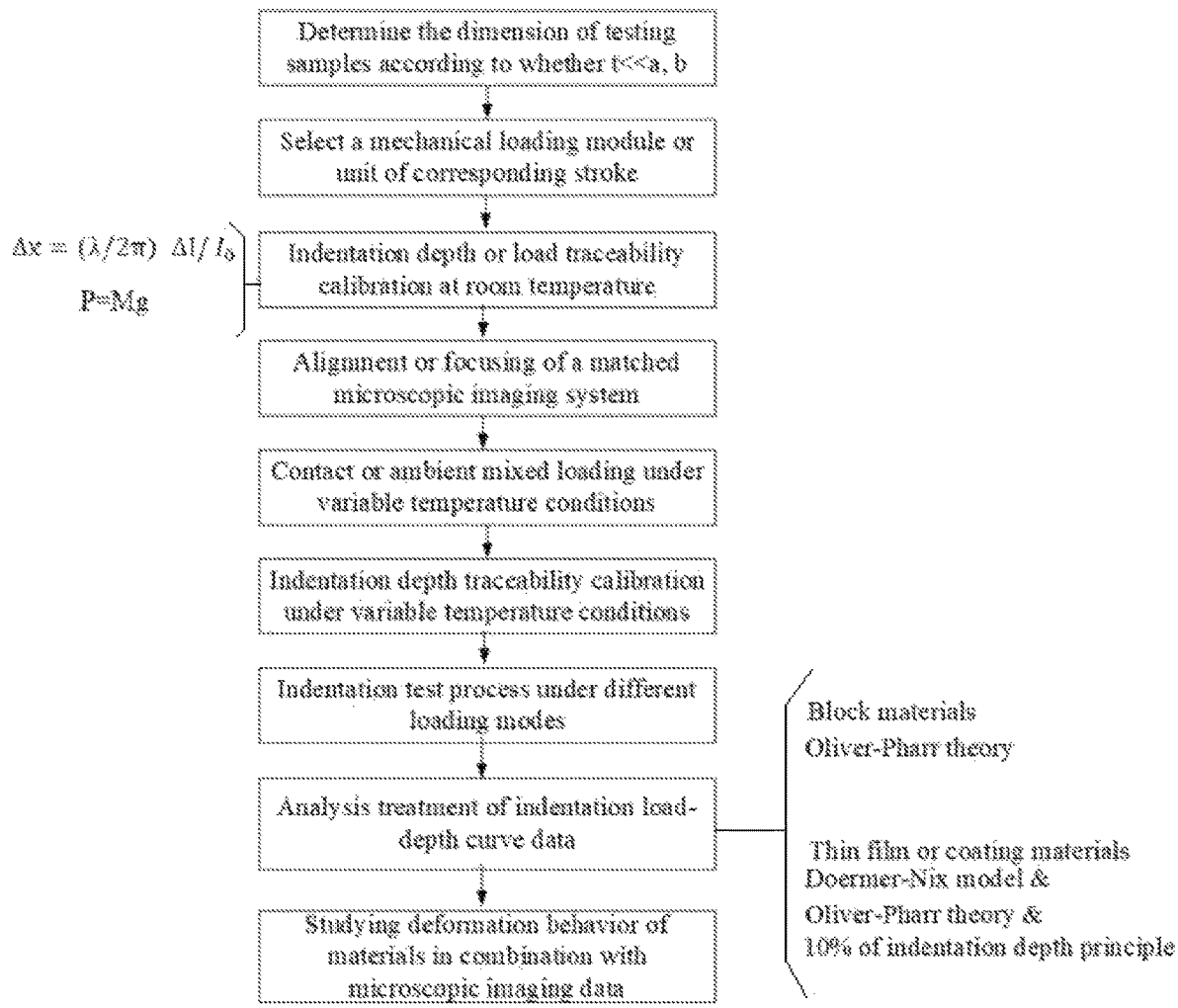
FIG. 11 is a flow block diagram of a traceable in-situ micro- and nano-indentation testing method under variable temperature conditions disclosed by the present disclosure.

Referring to FIG. 6, FIG. 7 and FIG. 10, in the contact or ambient mixed variable temperature module 12, testing samples 1212 having different dimensions (including block materials, two-dimensional thin film materials growing or coated on the substrate materials, and the like) are in clearance fit with a thermal insulation framework 1214 for point exchange, and are fixed through the negative pressure adsorption tank substrate 1211. The negative pressure adsorption tank substrate 1211 is fixedly connected with a thread copper sleeve located in a through hole of the lower refrigerating unit 1210 through fine threads, and is communicated with a negative pressure adsorption opening 127 in the lower refrigerating unit 1210. The sinking tank is milled in the lower refrigerating unit 1210, on the basis of guaranteeing point exchange space in a plane at the two sides of the thermal insulation framework 1214, a Rb—Fe—B permanent magnet 1224 with a waist-shaped tank is fixed through two hexagon socket cap screws, and a distribution of a magnetic field at the micro-zone mechanical testing zone is varied through moving the position of the magnet relative to the mounted screws. In order to guarantee that the deformation amount of the lower refrigerating unit 1210 along with a temperature in the variable temperature loading environment cannot be introduced into a displacement measurement result, the lower refrigerating unit X-shaped support plate 1219 cooperates with four sets of disc springs 1225 to guarantee the surface stiffness of the testing samples 1212, and is fixedly connected with a lower cavity body 128. An upper refrigerating unit 129 and a replaceable gas outlet cover plate 124 form an inert gas storage chamber and an annular gas outlet tank, the upper refrigerating unit 129 is fixedly connected with an upper chamber cover 1222 through an upper refrigerating unit supporting plate 1226 and is closed for thermal insulation through a pressure plate 123. Inert gas is introduced into the annular storage chamber through an ambient pump inlet 121 to be sufficiently refrigerated or heated, then the refrigerated or heated inert gas performs a uniform temperature loading on the indentation holder 312 through the annular gas outlet tank, and the diameter of the indentation holder 312 is guaranteed to be slightly smaller than the size of the preset through hole, so that overflowing of refrigerating ambient gas is reduced. A refrigerant refrigerates the upper refrigerating unit 129 and the lower refrigerating unit 1210 respectively through an upper chamber cover refrigerating medium inlet 125 and a lower chamber body refrigerating medium inlet 126, and heating power is changed through an upper chamber cover temperature control lead 1221 and a lower chamber temperature control lead 122 to realize continuously variable temperature loading for the testing samples 1212 with different dimensions and the indentation holder 312, and the thermal insulation materials 1223 are filled in the chamber for thermal preservation and thermal insulation. An upper chamber cover 1222 and the lower chamber body 128 are positioned through engaged positioning grooves. The plurality of groups of the connecting rod assemblies 1220 are locked to reduce overflowing of the refrigerating gas at split junction surfaces, and the lower chamber body 128 with the through hole is mounted and fixed on the closed-loop large-stroke function switchable platform 111 through the second connecting plate 1213.

Based on the micro-zone mechanical testing parameters, for the testing samples 1212 with different dimensions, fixing manners and point exchange methods therefor are matched with each other. In a negative pressure adsorption fixing manner, the thermal insulation framework 1214 is connected with a two-dimensional stick-slip piezoelectric point exchange platform 1217 through a third connecting plate 1215, an optical-approaching laser interferometer probe assembly 1216 for the functional indentation tip 393 is fixedly mounted on the third connecting plate 1215, and in combination with the two-dimensional stick-slip type piezoelectric point exchange platform 1217, two regulating degrees of freedom are provided. The two-dimensional stick-slip piezoelectric point exchange platform 1217 is fixedly mounted on the second connecting plate 1213 through an N-shaped connecting plate 1218.

The lower refrigerating unit X-shaped supporting plate 1219 and the disc springs 1225 are made of the materials with low thermal shrinkage rate. The upper refrigerating unit 129 and the lower refrigerating unit 1210 are made of materials with high thermal conductivity.

In some embodiments, the contact or ambient mixed variable temperature module 12 is supported by the mounting frame 131, the indentation depth traceability calibration indentation module 13 is mounted on the closed-loop large-stroke function switchable platform 11 through the connecting plate, an axis of the laser interferometer probe 133 is regulated to coincide with that of a standard aluminum lens stuck at the tail end of the indentation holder 312, of the macro-micro switchable mechanical loading module 3 through the laser interferometer adjusting frame 132, and displacement output amount of a direct-reflection laser incidence or reflection light path 134 under demarcated variable temperature conditions is formed.

Referring to FIG. 1-FIG. 10, the traceable in-situ micro- and nano-indentation testing method under variable temperature conditions disclosed by the present disclosure is characterized in that the mechanical loading modules to be used are determined according to the dimensions of the testing samples 1212. For a block or a thin film (only limited to the thin film growing or coated on a substrate material) which takes an indentation test as a core, a variable-temperature micro-zone mechanical property in-situ testing and traceability calibration method includes the following steps.

Firstly, the functional indentation tip 393 at the tail end of the indentation holder 312 of the macro-micro switchable mechanical loading module 3 is replaced with the standard aluminum lens, the axis of the laser interferometer probe 133 is regulated to coincide with that of the standard aluminum lens through the laser interferometer adjusting frame 132, and traceability calibration is performed on the indentation displacement of the air indentation for the macro-micro switchable mechanical loading module 3 at the room temperature. All functional components are kept fixed in positions. Oxygen and water vapor in the chamber are removed by repeatedly displacing the ambient through a vacuum pump assembly and a compressing ambient gas cylinder of the vacuum or ambient chamber module 1. When the ambient pressure is close to an atmosphere pressure, an internal circulating pump is started, a continuous variable temperature ambient loading environment is formed through an inert ambient by a refrigerating unit and a temperature control resistance wire; the traceability calibration is performed on the indentation displacement of the air indentation for the macro-micro switchable mechanical loading module 3 under the variable temperature conditions.

Secondly, a block sample is bonded onto the surface of the negative pressure adsorption tank substrate 121 through low-temperature varnish, and at this time, a linear point exchange is performed for an indentation position through the contact or ambient mixed variable temperature module 12 placed on the closed-loop large-stroke function switchable platform 111; or the block sample is placed in the groove of the thermal insulation framework 123, the testing samples 1212 are firmly adsorbed through the negative pressure adsorption tank substrate 121 by controlling a switch of the negative pressure adsorption pump, the thermal insulation framework 123 is dragged through the two-dimensional stick-slip piezoelectric point exchange platform 125 to perform point exchange in a plane, a point exchange position is accurately positioned through the indentation position optical positioning module 5. The optical contact reference ring 394 is designed at the tail end of the indentation holder 312, displacement signal increment variation can be detected through the optical-approaching laser interferometer probe assembly 124, the first direct-current servo displacement driving platform 36 drives the indentation holder 312 to rapidly approach the testing samples 1212, and then a precise loading is performed by the large-stroke pre-loading piezoelectric actuator 310.

A fixing manner and a point exchange method for a nano thin film sample are consistent with those of the block sample, in view of a principle that the a maximum indentation depth is less than 10% of a thickness of the thin film sample, the ambient refrigerating upper chamber in the contact or ambient mixed variable temperature module 12 is wholly removed, at this time, through cooperation of the nano mechanical loading module 4 with the optical microscopic in-situ observation or alignment module 6, the space between the MEMS micro force sensor 42 and the nano thin film sample is controlled to be within the displacement output amount of the bridge amplification flexible hinge 44 to complete alignment, then an angle and a working distance between the monocular optical microscopic imaging assembly 65 and the loading axis of the indentation tip are regulated, and in-situ observation of micro-zone deformation behavior of the thin film material is implemented based on a microscopic imaging system.

Finally, in combination with surface topography and deformation damage images of indentation zones of materials under variable temperature conditions, a data processing is performed for an indentation load-depth curve obtained through testing the materials with different dimensions, based on a classical analysis theory (such as an Oliver-Pharr method, an indentation energy-contact stiffness method and a pure indentation energy method). Micro-zone mechanical property indexes such as the hardness and the Young's modulus of the materials under corresponding temperature conditions, are obtained.

Examples

An in-situ micro- and nano-indentation testing method under variable temperature conditions is described in detail as below.

Referring to FIG. 10, assuming testing samples 1212 have a thickness t and plane lengths a, b, if t meets t<<a, b, the testing samples 1212 are block materials; or else, the testing samples 1212 are thin film materials. Then, the mechanical loading modules to be used are determined according to the dimensions of the testing samples 1212, and a general working procedure of variable-temperature micro-zone mechanical property in-situ testing and traceability calibration for the block or thin film material (only limited to the thin film material growing or coated on the substrate material), taking an indentation test as a core, is as follows.

Figure 9:
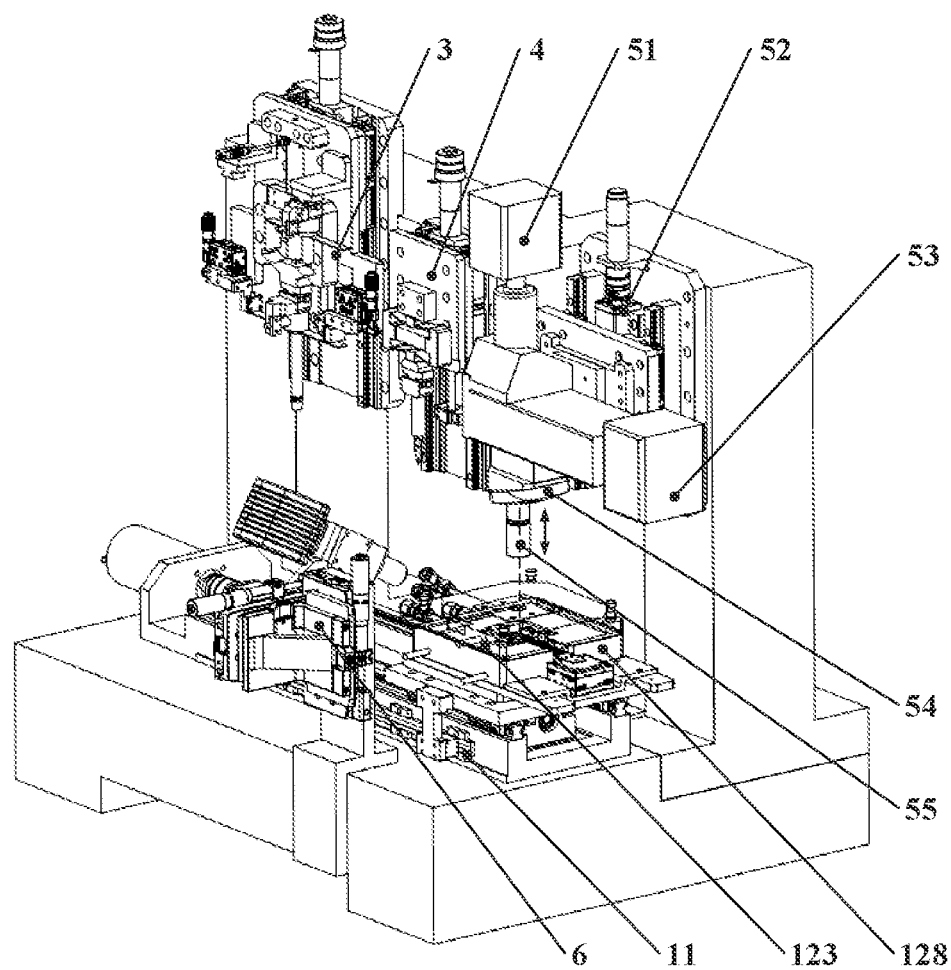
FIG. 9 is an axonometric drawing of a low-temperature or room temperature microscopic imaging state disclosed by the present disclosure.

Firstly, referring to FIG. 9, the functional indentation tip 393 at the tail end of the indentation holder 312 of the macro-micro switchable mechanical loading module 3 is replaced with the standard aluminum lens, the axis of the laser interferometer probe 133 is regulated to coincide with that of the standard aluminum lens through the laser interferometer adjusting frame 132, traceability calibration is performed on the indentation displacement of the air indentation for the macro-micro switchable mechanical loading module 3 at the room temperature, the variation amount $\Delta x$ of indentation displacement can be calibrated according to peak value variation quantity $\Delta I$ of the reflection laser signal and peak-to-peak value $I_0$ of the incidence signal, and the expression is provided as follows:

$$\Delta x = (\lambda/2\pi)\Delta I/I_0 \qquad (1)$$

where the wavelength $\lambda$ of the laser interferometer is traceable to international standard. Accordingly, traceability calibration is performed on indentation loads in a whole measuring range at the room temperature through a precise mass balance and E1-stage traceable standard weight; and the relation expression of the indentation load P and weight mass M is:

$$P = Mg \qquad (2)$$

A temperature drift phenomenon under variable temperature conditions is gradually remarkable. One of the factors causing the temperature drift phenomenon is displacement variation $\Delta L$ caused by thermal expansion or contraction of the indentation holder 312. Assuming that a loading temperature is $T_u$, the length of the indentation holder 312 at different temperatures is expressed as $L_T$, the length of the indentation holder 312 at the room temperature T is expressed as L, and then the expression of the displacement variation $\Delta L$ of the indentation holder 312 under variable temperature conditions is:

$$T<293K, \Delta L/L = (L-L_T)/L \qquad (3)$$

$$T>293K, \Delta L/L_{T_u-T} = \Delta L/L_{293K-T} + (\alpha_{293K})(T_u-293K) \qquad (4)$$

$$\alpha = (1/L)dL/dT \qquad (5)$$

where, $\alpha$ represents the thermal expansion coefficient of the materials, and the thermal contraction coefficient of the materials always presents a non-linear relationship along with a temperature. Another of the factors causing the temperature drift phenomenon under variable temperature conditions is a large heat flow existing between the functional indentation tip 393 and the testing samples 1212, which directly influences the accuracy of indentation depth measurement, so that it is necessary to perform traceability calibration on the indentation depth under variable temperature conditions.

Referring to FIG. 1, all functional components are fixed in positions, oxygen and water vapor in the chamber are removed by repeatedly displacing the ambient through the vacuum pump assembly and the compressing ambient gas cylinder of the vacuum and ambient chamber module 1 to enable the ambient pressure in the chamber to be close to the atmosphere pressure, the internal circulating pump is started, the continuous variable temperature ambient loading environment is formed through the inert ambient via the refrigerating unit and the temperature control resistance wire, and traceability calibration is performed on the indentation depth of the air indentation for the macro-micro switchable mechanical loading module 3 under the variable temperature conditions.

Secondly, a block sample is bonded onto the surface of the negative pressure adsorption tank substrate 121 through low-temperature varnish, and at this time, a linear point exchange is performed for the indentation position through the contact or ambient mixed variable temperature module 12 placed on the closed-loop large-stroke function switchable platform 111; or the block sample is placed in the groove of the thermal insulation framework 123, the testing samples 1212 are firmly adsorbed through the negative pressure adsorption tank substrate 121 by controlling a switch of the negative pressure adsorption pump, the thermal insulation framework 123 is dragged through the two-dimensional stick-slip piezoelectric point exchange platform 125 to perform a point exchange in a plane. The point exchange position is accurately positioned through the indentation position optical positioning module 5, the first direct-current servo displacement driving platform 36 drives the indentation holder 312 to rapidly approach the testing samples 1212, the optical contact reference ring 394 is designed at the tail end of the indentation holder 312, displacement signal increment variation can be detected through the laser interferometer probe assembly 124, which indicates that the indentation holder 312 has approached the samples 1212, and then the large-stroke pre-loading piezoelectric actuator 310 is used to perform precise driving and loading.

A fixing manner and a point exchange method for the thin film sample are consistent with those of the block sample, in view of a principle that a maximum indentation depth is less than 10% of a thickness of the thin film sample, the ambient refrigerating upper chamber in the contact or ambient mixed variable temperature module 12 can be wholly removed. Through cooperation of the nano mechanical loading module 4 with the optical microscopic in-situ observation or alignment module 6, the space between the MEMS micro force sensor 42 and the nano thin film sample is controlled to be within the displacement output amount of the bridge amplification flexible hinge 44 to complete alignment, then an angle and a working distance between the monocular optical microscopic imaging assembly 65 and the loading axis of the indentation tip are regulated, and in-situ observation of micro-zone deformation behavior of the thin film material can be performed based on a microscopic imaging system.

The specific functional indentation tip 393 is selected according to different testing requirements to complete a series of indentation testing processes in different loading modes, processing analysis is performed through the classical Oliver-Pharr method for the indentation load-depth curve of the block materials, which is not repeated alone. For the thin film material or the coating material, based on a principle that the a maximum indentation depth is less than 10% of a thickness of the thin film material, the hardness of the materials under corresponding variable temperature conditions can be conveniently obtained, at this time, substrate effect can be often ignored, the Young's modulus of the thin film or coating material can be calculated through the empirical equation of an indentation Doermer-Nix model by a Berkovich indentation tip and the classical Oliver-Pharr method, the expression is as follows:

$$\frac{dh}{dP} = \frac{1}{2h_c}\left(\frac{\pi}{24.5}\right)^{1/2}\left[\frac{1-v_f^2}{E_f}\left(1-e^{-\alpha t/h_c}\right) + \frac{1-v_s^2}{E_s}\left(e^{-\alpha t/h_c}\right) + \frac{1-v_i^2}{E_i}\right] \quad (6)$$

$$h_c = h_{max} - \varepsilon\frac{P_{max}}{S} \quad (7)$$

$$S = 2\beta E_r h_c \sqrt{\frac{24.5}{\pi}} \quad (8)$$

where, h represents an indentation depth, $h_c$ represents a contact indentation depth, $h_{max}$ represents a maximum indentation depth, P represents an indentation load, $P_{max}$ represents a maximum indentation load, $E_f$, $E_s$ and $E_i$ respectively represent the Young's modulus of a thin film, a substrate material and the indentation tip, correspondingly, $v_f$, $v_s$ and $v_i$ respectively represent the Poisson's ratio of the thin film, the substrate material and the indentation tip, S represents a contact stiffness, t represents the thickness of the thin film, $E_r$ represents the reduced modulus of the system, and empirical factors $\beta$, $\alpha$, and $\varepsilon$ are selected according to the geometrical shape of the indentation tip.

The above are only preferred examples of the present disclosure and are not intended to limit the present disclosure. In particular, the contact or ambient mixed variable temperature module 12 mentioned above can also be replaced with equivalent functional products from companies such as INSTEC in the United States and LinKam in the United Kingdom. For those skilled in the art, the present disclosure can have various modifications and variations. Any modifications, equivalent replacements, improvements and the like made within the spirit and principle of the present disclosure shall be included within the protection scope of the present application.

What is claimed is:

1. A traceable in-situ micro- and nano-indentation testing instrument under variable temperature conditions, comprising a vacuum or ambient chamber module, a gantry beam, a macro-micro switchable mechanical loading module, a nano mechanical loading module, an indentation position optical positioning module, an optical microscopic in-situ observation or alignment module, a metal bellows, an air floating vibration isolation platform, an optical breadboard, a marble pedestal, a function switchable module and a contact or ambient mixed variable temperature module, wherein the macro-micro switchable mechanical loading module, the nano mechanical loading module and the indentation position optical positioning module are fixed on the gantry beam, and mechanical loading axes and optical imaging axes are laterally coincided by regulating thicknesses of shims; an optical imaging axis of the optical microscopic in-situ observation or alignment module and a loading axis of the nano mechanical loading module are coplanar, the optical microscopic in-situ observation or alignment module and the function switchable module are mounted on a table top of the marble pedestal in a nonintervention manner, and the contact or ambient mixed variable temperature module is fixedly mounted on the function switchable module; and a sinking tank is milled in a lower end surface of the marble pedestal which is mounted on the optical breadboard, the optical breadboard guarantees airtightness of the vacuum or ambient chamber module through the metal bellows to be further connected with the air floating vibration isolation platform, to isolate medium-frequency and high-frequency vibration noises outside the device.

2. The traceable in-situ micro- and nano-indentation testing instrument under variable temperature conditions according to claim 1, wherein in the macro-micro switchable mechanical loading module, a large-stroke pre-loading piezoelectric actuator is fixedly mounted on a first direct-current servo displacement driving platform through a piezoelectric ceramic fixing seat and a direct-acting flexible hinge, and a macro mechanical loading detection unit is connected to a displacement output end of the direct-acting flexible hinge through a dovetail-shaped mounting block; a micro mechanical loading detection unit having a same assembling structure as the macro mechanical loading detection unit, as a fast-inserting replacement module, is fixed on an L-shaped connecting frame positioned at two sides of the large-stroke pre-loading piezoelectric actuator through the dovetail-shaped mounting block; and the macro mechanical loading detection unit and the micro mechanical loading detection unit which are switchable, each are equipped with a unipolar plate capacitive displacement sensor and a strain gage force measuring unit having a corresponding measuring range, and the macro mechanical loading detection unit and the micro mechanical loading detection unit cooperate with an independent manual displacement platform to regulate a space between the unipolar plate capacitive displacement sensor and an indentation displacement measuring plate to realize a mechanical loading testing function for materials with different dimensions.

3. The traceable in-situ micro- and nano-indentation testing instrument under variable temperature conditions according to claim 2, wherein, the macro mechanical loading detection unit and the micro mechanical loading detection unit perform micro-zone mechanical testing functions for indentations, scratches and reciprocating friction abrasion by replacing a functional indentation tip; and the functional indentation tip is fixed at a tail end of an indentation holder with an optical contact reference ring through a first set screw.

4. The traceable in-situ micro- and nano-indentation testing instrument under variable temperature conditions according to claim 2, wherein, the strain gage force measuring unit is connected with a force measuring unit connecting block through threads, and is limited through a force measuring unit lead pressing sheet, and the force measuring unit connecting block is fixedly connected to the dovetail-shaped mounting block through a second set screw.

5. The traceable in-situ micro- and nano-indentation testing instrument under variable temperature conditions according to claim 1, wherein in the nano mechanical loading module, an MEMS micro force sensor is fixedly mounted at a tail end of a rigid connecting bar through a screw, and is connected to a displacement output end of a bridge amplification flexible hinge through a dovetail-shaped mounting block, wherein a closed-loop pre-loading piezoelectric actuator is mounted in the bridge amplification flexible hinge which is fixedly connected to a movement table top of a second direct-current servo displacement driving platform.

6. The traceable in-situ micro- and nano-indentation testing instrument under variable temperature conditions according to claim 1, wherein in the indentation position optical positioning module, a microscopic imaging assembly is mounted on a focusing platform through a connecting plate to locate a micro-zone mechanical property testing position, the optical microscopic imaging assembly comprises a CCD image collector, a low-power-consumption LED light source and a long-working-distance objective lens connected to an electric objective lens rotary table, to realize optical imaging of a micro-zone mechanical property testing zone at a room temperature or low temperature; and the CCD image collector is mounted at an optical microscopic imaging body through a standard C-shaped interface.

7. The traceable in-situ micro- and nano-indentation testing instrument under variable temperature conditions according to claim 1, wherein in the optical microscopic in-situ observation or alignment module, a monocular optical microscopic imaging assembly regulates three degrees of freedom of an optical imaging zone through a monocular optical microscopic imaging assembly angle regulating frame, a first manual focusing platform and a second manual focusing platform, and is fixedly mounted on the marble pedestal through a first connecting plate, wherein the monocular optical microscopic imaging assembly angle regulating frame regulates an angle between an imaging axis of the monocular optical microscopic imaging assembly and a loading axis of the nano mechanical loading module through an arc waist shaped tank, and provides an additional degree of freedom for the monocular optical microscopic imaging assembly through a closed-loop large-stroke function switchable platform in the function switchable module, to perform in-situ observation imaging of testing objects in micro-zone mechanical property testing zones.

8. The traceable in-situ micro- and nano-indentation testing instrument under variable temperature conditions according to claim 1, wherein in the contact or ambient mixed variable temperature module, testing samples are in clearance fit with a thermal insulation framework, and are fixed through a negative pressure adsorption tank substrate, and the negative pressure adsorption tank substrate is fixedly connected with a lower refrigerating unit and communicated with a negative pressure adsorption opening; a sinking tank is milled in the lower refrigerating unit, and Rb-Fe-B permanent magnets are fixed on two sides of the thermal insulation framework; a lower refrigerating unit X-shaped supporting plate cooperates with four sets of disc springs to guarantee surface stiffness of testing samples, and is fixedly connected with a lower cavity body; an upper refrigerating unit and a replaceable gas outlet cover plate form an inert gas storage chamber and an annular gas outlet tank, the upper refrigerating unit 129 is fixedly connected with an upper cavity cover through an upper refrigerating unit supporting plate and is closed for thermal insulation through a pressure plate, wherein inert gas is introduced into the annular storage chamber through an ambient pump inlet to be sufficiently refrigerated or heated, and then passes through the annular gas outlet tank to apply a uniform temperature load on the indentation holder; a refrigerant refrigerates the upper refrigerating unit and the lower refrigerating unit through an upper cavity cover refrigerating medium inlet and a lower cavity body refrigerating medium inlet, and thermal insulation materials are filled in the chamber for thermal preservation and thermal insulation; and the upper cavity cover and the lower cavity body are positioned through a positioning groove, and are locked through multiple sets of connecting rod assemblies, and the lower cavity body with a through hole is mounted and fixed on the closed-loop large-stroke function switchable platform through a second connecting plate.

9. A traceable in-situ micro- and nano-indentation testing method under variable temperature conditions, through a traceable in-situ micro- and nano-indentation testing instrument under variable temperature conditions, wherein the testing instrument comprises a vacuum or ambient chamber module, a gantry beam, a macro-micro switchable mechanical loading module, a nano mechanical loading module, an indentation position optical positioning module, an optical microscopic in-situ observation or alignment module, a metal bellows, an air floating vibration isolation platform, an optical breadboard, a marble pedestal, a function switchable module and a contact or ambient mixed variable temperature module, wherein the macro-micro switchable mechanical loading module, the nano mechanical loading module and the indentation position optical positioning module are fixed on the gantry beam, and mechanical loading axes and optical imaging axes are laterally coincided by regulating thicknesses of shims; an optical imaging axis of the optical microscopic in-situ observation or alignment module and a loading axis of the nano mechanical loading module are coplanar, the optical microscopic in-situ observation or alignment module and the function switchable module are mounted on a table top of the marble pedestal in a nonintervention manner, and the contact or ambient mixed variable temperature module is fixedly mounted on the function switchable module; and a sinking tank is milled in a lower end surface of the marble pedestal which is mounted on the optical breadboard, the optical breadboard guarantees airtightness of the vacuum or ambient chamber module through the metal bellows to be further connected with the air floating vibration isolation platform, to isolate medium-frequency and high-frequency vibration noises outside the device;

wherein, the testing method is configured for a variable-temperature micro-zone mechanical property in-situ testing and traceability calibration for a block or thin film material based on an indentation test, and comprises following steps:

replacing the functional indentation tip at the tail end of the indentation holder of the macro-micro switchable mechanical loading module with a standard aluminum lens, regulating an axis of a laser interferometer probe to coincide with that of the standard aluminum lens through a laser interferometer adjusting frame, and performing traceability calibration on an indentation displacement for an air indentation of the macro-micro switchable mechanical loading module at a room temperature; removing oxygen and water vapor in the chamber by repeatedly replacing ambient through a vacuum pump assembly and a compressing ambient gas cylinder of the vacuum and ambient chamber module to enable an ambient pressure in the chamber to be close to an atmosphere pressure, starting an internal circulating pump, forming a continuous variable temperature ambient loading environment through inert ambient by a refrigerating unit and a temperature control resistance wire, and performing the traceability calibration on the indentation displacement of the air indentation for the macro-micro switchable mechanical loading module under variable temperature conditions;

bonding a block sample onto a surface of the negative pressure adsorption tank substrate through low-temperature varnish, and performing a linear point exchange for an indentation position through the contact or ambient mixed variable temperature module placed on the closed-loop large-stroke function switchable platform; or placing the block sample in a groove of the thermal insulation framework, firmly absorbing the testing samples through the negative pressure adsorption tank substrate by controlling a switch of a negative pressure adsorption pump, dragging the thermal insulation framework by the two-dimensional stick-slip piezoelectric point exchange platform to perform the point exchange in a plane, accurately positioning a point exchange position through the indentation position optical positioning module, providing the optical contact reference ring at the tail end of the indentation holder, detecting displacement signal increment variation through the optical-approaching laser interferometer probe assembly, driving the indentation holder by the first direct-current servo displacement driving platform to rapidly approach the testing samples, and then utilizing the large-stroke pre-loading piezoelectric actuator to perform precise driving and loading.

10. The traceable in-situ micro- and nano-indentation testing method under variable temperature conditions according to claim 9, wherein, configuring a fixing manner and a point exchange method for a nano thin film sample to be consistent with those of the block sample, in view of a principle that a maximum indentation depth is less than 10% of a thickness of the thin film sample, wholly removing an ambient refrigerating upper chamber in the contact or ambient mixed variable temperature module, controlling a space between the MEMS micro force sensor and the nano thin film sample to be within a displacement output amount of the bridge amplification flexible hinge to complete alignment through cooperation of the nano mechanical loading module with the optical microscopic in-situ observation or alignment module, then regulating an angle and a working distance between the monocular optical microscopic imaging assembly and a loading axis of the indentation tip, and performing in-situ observation of micro-zone deformation behavior of the thin film sample based on a microscopic imaging system; and in combination with surface topography and deformation damage images of indentation zones of materials under variable temperature conditions, obtaining an indentation load-depth curve through testing the materials with different dimensions and performing data processing of the indentation load-depth curve based on a classical analysis theory, and obtaining hardness and Young's modulus of micro-zone mechanical property indexes of the materials under corresponding temperature conditions.

11. The traceable in-situ micro- and nano-indentation testing method under variable temperature conditions according to claim 9, wherein in the macro-micro switchable mechanical loading module, a large-stroke pre-loading piezoelectric actuator is fixedly mounted on a first direct-current servo displacement driving platform through a piezoelectric ceramic fixing seat and a direct-acting flexible hinge, and a macro mechanical loading detection unit is connected to a displacement output end of the direct-acting flexible hinge through a dovetail-shaped mounting block; a micro mechanical loading detection unit having a same assembling structure as the macro mechanical loading detection unit, as a fast-inserting replacement module, is fixed on an L-shaped connecting frame positioned at two sides of the large-stroke pre-loading piezoelectric actuator through the dovetail-shaped mounting block; and the macro mechanical loading detection unit and the micro mechanical loading detection unit which are switchable, each are equipped with a unipolar plate capacitive displacement sensor and a strain gage force measuring unit having a corresponding measuring range, and the macro mechanical loading detection unit and the micro mechanical loading detection unit cooperate with an independent manual displacement platform to regulate a space between the unipolar plate capacitive displacement sensor and an indentation displacement measuring plate to realize a mechanical loading testing function for materials with different dimensions.

12. The traceable in-situ micro- and nano-indentation testing method under variable temperature conditions according to claim 11, wherein, the macro mechanical loading detection unit and the micro mechanical loading detection unit perform micro-zone mechanical testing functions for indentations, scratches and reciprocating friction abrasion by replacing a functional indentation tip; and the functional indentation tip is fixed at a tail end of an indentation holder with an optical contact reference ring through a first set screw.

13. The traceable in-situ micro- and nano-indentation testing method under variable temperature conditions according to claim 11, wherein, the strain gage force measuring unit is connected with a force measuring unit connecting block through threads, and is limited through a force measuring unit lead pressing sheet, and the force measuring unit connecting block is fixedly connected to the dovetail-shaped mounting block through a second set screw.

14. The traceable in-situ micro- and nano-indentation testing method under variable temperature conditions according to claim 9, wherein in the nano mechanical loading module, an MEMS micro force sensor is fixedly mounted at a tail end of a rigid connecting bar through a screw, and is connected to a displacement output end of a bridge amplification flexible hinge through a dovetail-shaped mounting block, wherein a closed-loop pre-loading piezoelectric actuator is mounted in the bridge amplification flexible hinge which is fixedly connected to a movement table top of a second direct-current servo displacement driving platform.

15. The traceable in-situ micro- and nano-indentation testing method under variable temperature conditions according to claim 9, wherein in the indentation position optical positioning module, a microscopic imaging assembly is mounted on a focusing platform through a connecting plate to locate a micro-zone mechanical property testing position, the optical microscopic imaging assembly comprises a CCD image collector, a low-power-consumption LED light source and a long-working-distance objective lens connected to an electric objective lens rotary table, to realize optical imaging of a micro-zone mechanical property testing zone at a room temperature or low temperature; and the CCD image collector is mounted at an optical microscopic imaging body through a standard C-shaped interface.

16. The traceable in-situ micro- and nano-indentation testing method under variable temperature conditions according to claim 9, wherein in the optical microscopic in-situ observation or alignment module, a monocular optical microscopic imaging assembly regulate three degrees of freedom of an optical imaging zone through a monocular optical microscopic imaging assembly angle regulating frame, a first manual focusing platform and a second manual focusing platform, and is fixedly mounted on the marble pedestal through a first connecting plate, wherein the monocular optical microscopic imaging assembly angle regulating frame regulates an angle between an imaging axis of the monocular optical microscopic imaging assembly and a loading axis of the nano mechanical loading module through an arc waist shaped tank, and provides an additional degree of freedom for the monocular optical microscopic imaging assembly through a closed-loop large-stroke function switchable platform in the function switchable module, to perform in-situ observation imaging of testing objects in microzone mechanical property testing zones.

17. The traceable in-situ micro- and nano-indentation testing method under variable temperature conditions according to claim 9, wherein in the contact or ambient mixed variable temperature module, testing samples are in clearance fit with a thermal insulation framework, and are fixed through a negative pressure adsorption tank substrate, and the negative pressure adsorption tank substrate is fixedly connected with a lower refrigerating unit and communicated with a negative pressure adsorption opening; a sinking tank is milled in the lower refrigerating unit, and Rb-Fe-B permanent magnets are fixed on two sides of the thermal insulation framework; a lower refrigerating unit X-shaped supporting plate cooperates with four sets of disc springs to guarantee surface stiffness of testing samples, and is fixedly connected with a lower cavity body; an upper refrigerating unit and a replaceable gas outlet cover plate form an inert gas storage chamber and an annular gas outlet tank, the upper refrigerating unit is fixedly connected with an upper cavity cover through an upper refrigerating unit supporting plate and is closed for thermal insulation through a pressure plate, wherein inert gas is introduced into the annular storage chamber through an ambient pump inlet to be sufficiently refrigerated or heated, and then passes through the annular gas outlet tank to apply a uniform temperature load on the indentation holder; a refrigerant refrigerates the upper refrigerating unit and the lower refrigerating unit through an upper cavity cover refrigerating medium inlet and a lower cavity body refrigerating medium inlet, and thermal insulation materials are filled in the chamber for thermal preservation and thermal insulation; and the upper cavity cover and the lower cavity body are positioned through a positioning groove, and are locked through multiple sets of connecting rod assemblies, and the lower cavity body with a through hole is mounted and fixed on the closed-loop large-stroke function switchable platform through a second connecting plate.

\* \* \* \* \*